United States Patent
Dijkstra et al.

[11] Patent Number: 5,986,664
[45] Date of Patent: Nov. 16, 1999

[54] METHOD AND DEVICE FOR GRAPHICS MAPPING OF A SURFACE ONTO A TWO-DIMENSIONAL IMAGE

[75] Inventors: Hendrik Dijkstra; Patrick F. P. Meijers, both of Eindhoven, Netherlands

[73] Assignee: U.S. Philips Corporation, New York, N.Y.

[21] Appl. No.: 08/848,366

[22] Filed: Apr. 30, 1997

[30] Foreign Application Priority Data

May 6, 1996 [EP] European Pat. Off. .............. 96201244

[51] Int. Cl.⁶ .................................................. G06F 19/00
[52] U.S. Cl. .............................................................. 345/429
[58] Field of Search ................................... 345/421–423, 345/425, 427, 430, 429

[56] References Cited

U.S. PATENT DOCUMENTS 5,307,450  4/1994  Grossman ................................ 345/423
5,594,846  1/1997  Donovan ................................ 395/130
5,777,623  7/1998  Small ..................................... 345/430
5,841,441  11/1998  Smith .................................... 345/430

*Primary Examiner*—Mark R. Powell
*Assistant Examiner*—Thu Nguyen
*Attorney, Agent, or Firm*—Gregory L. Thorne

[57] ABSTRACT

A series of points on a surface is projected onto pixels of an image along a projection axis. Furthermore, texture coordinates are allocated to the points as follows. First a normalized coordinate which is a ratio of the texture coordinate to a depth of the point along the projection axis is determined by linear interpolation. Displacement of the pixel is determined relative to a line in the image onto which a part of the surface, which has a constant depth in the projection direction, is projected. Subsequently, an interpolation function is calculated which interpolates the depth as a function of the displacement. The texture coordinate is determined by multiplication of the normalized coordinate by the depth. The image contribution by the point to an image content of the pixel is determined on the basis of the texture coordinate.

17 Claims, 2 Drawing Sheets

METHOD AND DEVICE FOR GRAPHICS MAPPING OF A SURFACE ONTO A TWO-DIMENSIONAL IMAGE

BACKGROUND OF THE INVENTION

1. Field of the Invention

The invention relates to a method for graphics mapping of a surface from an at least three-dimensional model space onto a two-dimensional image, in which a texture coordinate is allocated to a point on the surface and the point is projected, onto a pixel of the image along a projection axis. The method includes the following steps:

determining a normalized coordinate which is a ratio of the texture coordinate to a depth of the point along the projection axis;

determining the depth of the point;

determining the texture coordinate by multiplication of the normalized coordinate by the depth; and, determining an image contribution by the point to an image content of the pixel on the basis of the texture coordinate.

The invention also relates to a device for graphics mapping of a surface from an at least three-dimensional model space onto a two-dimensional image, in which a texture coordinate is allocated to a point on the surface and the point is projected, onto a pixel of the image along a projection axis, which device includes:

coordinate-determining means for determining a normalized coordinate which is a ratio of the texture coordinate to a depth of the point along the projection axis;

depth-determining means for determining the depth of the point;

multiplier means for multiplying the normalized coordinate by the depth in order to obtain the texture coordinate; and, image-forming means for determining an image contribution by the point to an image content of the pixel on the basis of the texture coordinate.

2. Description of the Related Art

A method of this kind is known from the copending U.S. patent application Ser. No. 08/346971 and its European equivalent EP 656 609 (PHB 33881). In the cited publication a triangle is mapped from a three-dimensional space onto a two-dimensional image. A point R on the triangle has an x, an y and a z coordinate (indicated by lower case letters). The projection of the point R in the image has an $X^*$-coordinate and a $Y^*$-coordinate (indicated by upper case letters).

Texture on the triangle is suggested by means of a texture map. The point R is mapped onto the texture map by allocation of a pair of texture coordinates $U^*,V^*$ thereto (upper case letters). The texture map allocates an intensity/color value to each pair of texture coordinates $U^*,V^*$. Using this coordinate pair $U^*,V^*$ as an index, the associated intensity/color value is looked up in the texture map and thereby the image contribution by the point R to the pixel where onto it is projected is determined.

In practice, however, not the point R is used but the coordinates $X^*,Y^*$ of the pixel, i.e. the projection of the point R. In order to determine the image contribution, the associated pair of texture coordinates $U^*,V^*$ must be found for the coordinates $X^*,Y^*$. To this end, in accordance with EP 656 609 first the depth z and the $X^*,Y^*$ and $U^*,V^*$ coordinates of the vertices of the triangle are determined. Subsequently, $U^*/z$, $V^*/z$ and $1/z$ are calculated for the vertices. The values $U^*/z$, $V^*/z$ and $1/z$ for the other points on the triangle can subsequently be determined, rather easily by linear interpolation of these values for the vertices. Subsequently, z is determined from the interpolated $1/z$ by inversion and finally $U^*$ and $V^*$ are determined by multiplication of the interpolated $U^*/z$ and $V^*/z$ by z. The inversion $1/z$ is problematic. Known computers, require a comparatively long period of time for the calculation of the inverse and special hardware for faster calculation of this inverse is very complex.

SUMMARY OF THE INVENTION

It is inter alia an object of the invention to provide a method and a device of the kind set forth which require less arithmetic work.

The method according to the invention is characterized in that the determination of the depth includes the following steps:

determining a displacement of the pixel relative to a line in the image onto which there is projected a part of the surface which has a constant depth in the projection direction;

calculating an interpolation function which interpolates the depth as a function of the displacement. Interpolation reduces the amount of arithmetic work required to determine the depth as compared with the inversion of $1/z$. Because interpolation is performed as a function of the displacement, moreover, fewer interpolation coefficients need be updated than if interpolation were to take place directly as a function of $X^*$ and $Y^*$. Consequently, less storage space is required for the storage of the interpolation coefficients.

A version of the method according to the invention in which the pixel is preceded by a series of pixels on a scan line in the image is characterized in that the displacement is determined by adding an increment to a further displacement of a preceding pixel of the series. The displacement increases linearly along the scan line. At every transition between successive pixels along the scan line the displacement increases by a fixed amount which is a function of the orientation of the surface relative to the scan line. As a result, the displacement can be determined by means of a minimum amount of arithmetic work.

A version of the method according to the invention is characterized in that there is a range of displacements of pixels onto which the surface is mapped, which range is subdivided into sub-ranges of displacements, that for calculation of the interpolation function in each sub-range of displacements a respective set of interpolation coefficients is used, and that the method includes a step of selecting a resolution of the subdivision into sub-ranges in dependence on a property of the surface. As the resolution of subdivision into sub-range is higher, the error caused by the interpolation will be smaller. (A higher resolution in this context means a smaller difference between the minimum and the maximum displacement value within a sub-range). The error can be limited to an acceptable value by choosing the resolution to be dependent on a property of the surface (such as the angle of the normal to the surface with the projection axis and/or the depth range of the surface). Therefore, for different mappings of the same surface, from different projection directions, the resolution may be different. This can be readily achieved because interpolation takes place as a function of the displacement.

A version of the method according to the invention utilizes an indexed set of texture maps having an index-dependent resolution, a current index being selected from the set of texture maps in dependence on the depth and the image contribution being determined in conformity with a texture value associated with the texture coordinate in an indexed texture map, and is characterized in that the current index is calculated by means of a further interpolation function of indices as a function of the displacement. The index is dependent on the derivative of the texture coordinate to the pixel coordinate and hence is in principle a rather complex function of inter alia the depth and the depth gradient. Arithmetic work is saved by calculating this index so as to be interpolated as a function of the displacement.

The embodiments of the device according to the invention utilize the versions of the method according to the invention and hence save arithmetic time/arithmetic circuits and/or storage space for tables with interpolation coefficients.

These and other aspects of the invention will be apparent from and elucidated with reference to the embodiments described hereinafter.

BRIEF DESCRIPTION OF THE DRAWINGS

In the drawings:

FIG. 1 shows a graphics processing system. This system includes a processor 1, a memory 2 and an image display unit 3. During operation the memory 2 stores parameters which describe a content of a three-dimensional space, for example in terms of coordinates of vertices of polygons. The processor 1 receives the coordinates of a view point wherefrom the space is viewed and calculates, using the parameters stored in the memory 2, the image content of an image thus obtained. The calculated image content is used for controlling the image display unit which thus displays the image in a manner which is visible to human users.

The image is obtained by projection of the polygons onto a projection plane.

Figure 1:
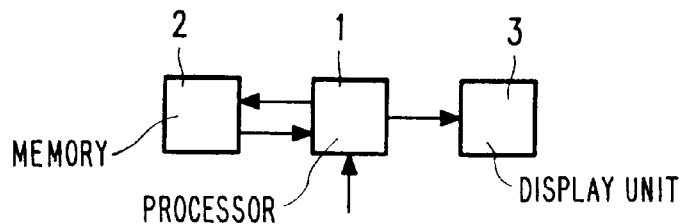
FIG. 1 shows a graphics processing system.
Figure 2:
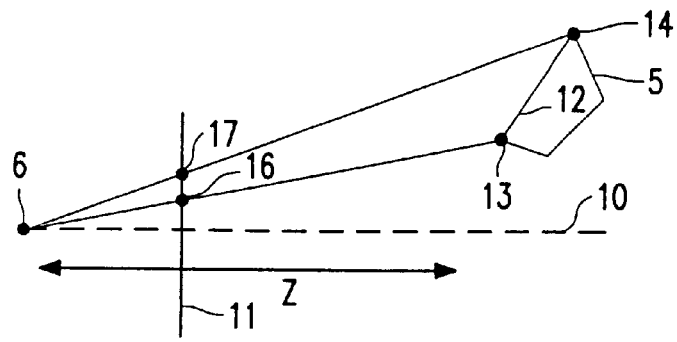
FIG. 2 is a side elevation of the geometry of a projection.

FIG. 2 is a side elevation of the geometry of a projection of one polygon. The Figure shows a polygonal surface 5 which is projected onto a projection plane 11. The projection plane 11 is shown from the side, so that only a line 11 remains which corresponds to the X-coordinate direction in the projection plane 11. The projection takes place along a projection axis 10 which is a normal to the projection plane 11 which extends through the view point 6.

An edge 12 of the polygonal surface 5 is separately indicated. This edge 12 extends between two vertices 13, 14 which are mapped onto two points 16, 17 in the image plane. For the sake of clarity of the projection, the projection lines through the vertices 13, 14, the mapped points 16, 17 and the view point are shown. The X-coordinate X* of the mapped point 16 is a ratio $x/z$ of the X coordinate x of the point 13 of the surface and the depth z of the point 13 in the projection direction along the projection axis 10. For the Y-coordinate Y* (not shown) of the mapped point 16 it also holds that $Y^*=y/z$.

Figure 3:
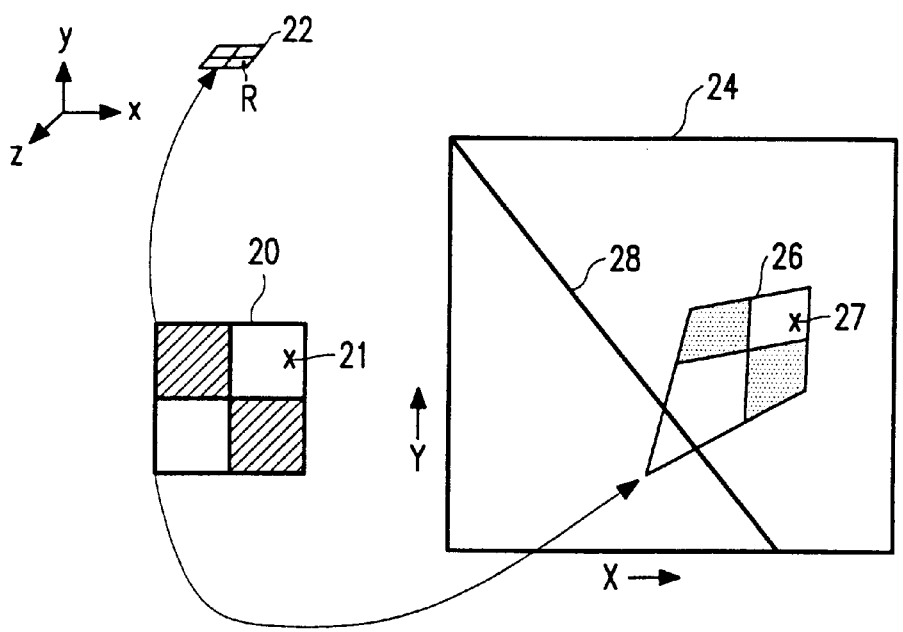
FIG. 3 shows the texture mapping.

FIG. 3 shows the principle of texture mapping. There is an image of a point R on the surface 22 at a point 21 having the texture coordinates $U^*(R), V^*(R)$ in the texture map 20. With the texture coordinates $U^*(R), V^*(R)$ there is associated a texture value $T(U^*(R), V^*(R))$. In addition, the projection maps the point R on a point 27 having the image coordinates $X^*(R), Y^*(R)$ in the image 24. Therefore, the texture value $T(U^*(R), V^*(R))$ is decisive in respect of the image contribution in the point 27 having coordinates $X^*(R), Y^*(R)$ in the image 24 on which the point R is mapped from the surface 22.

The image 24 is formed pixel-by-pixel. A pixel having a pixel coordinate pair $X^*_p, Y^*_p$ is used each time. Thus, not a point R in the space which is mapped on a coordinate pair $X^*(R), Y^*(R)$ is used, but exactly the opposite: R follows from the coordinate pair $X^*_p, Y^*_p$. From the coordinate $X^*_p, Y^*_p$ the associated texture coordinate $U^*_p, V^*_p$ is determined.

This can be expressed in formulas as follows. The texture map is defined by mapping the coordinates x, y, z of the point R on the surface 22 onto texture coordinates $U_p, V_p$ from the three-dimensional space as:

$$U^*_p = x\, a_x + y\, a_y + z\, a_z + u_0$$

$$V^*_p = x\, b_x + y\, b_y + z\, b_z + v_0$$

The coordinates $X^*_p, Y^*_p$ of the projection of the point R in the image 24 are $x/z, y/z$. The coordinates of the projection $X^*_p, Y^*_p$, therefore, are mapped on texture coordinates $U_p, V_p$ as:

$$U^*_p = z(X^*_p a_x + Y^*_p a_y + a_z) + u_0$$

$$V^*_p = z(X^*_p b_x + Y^*_p b_y + b_z) + v_0$$

If the depth z is known, the texture coordinates $U_p, V_p$ can be calculated from the coordinates $X^*_p, Y^*_p$ of the projection of the point R and the coefficients $u_0, v_0, a_x, a_y, a_z, b_x, b_y, b_z$ using no more than additions and multiplications. The coefficients $u_0, a_x, a_y, a_z, v_0, b_x, b_y, b_x$ can be determined from the values $U^*_p, V^*_p, X^*_p, Y^*_p$, z of three vertices of the polygon. For this determination the fact should be taken into account that a class $u_0, a_x, a_y, a_z$ leads each time to the same relation between $U^*_p$ and $X^*_p, Y^*_p$, because a relation exists between x, y and z on the surface 22. It suffices to determine one element of this class, for example the element with $u_0=0$. Analogously, it also suffices to determine $b_x, b_y, b_z$ for $v_0=0$.

In accordance with the invention z is obtained as follows. First a displacement L is determined for the pixel 27. This displacement L is defined as the distance from the pixel 27 to the line 28, i.e. the length of a perpendicular from the pixel 27 to the line 28 (the displacement L of a pixel to one side of the line, say the left-hand side, is then taken as minus this distance, and the displacement L of a pixel to the other side, say the right-hand side, as plus this distance).

The line 28 is chosen as a line of points in the image which are a map of a section of the surface 5 with an arbitrary plane extending parallel to the projection plane 11; all points of this section thus have the same depth z in the projection direction and, moreover, the section extends perpendicularly to the projection axis 10 but need not necessarily intersect said projection axis 10. In terms of the image this means that the line 28 extends parallel to the horizon of the map of the surface 5 (the horizon of a surface is the set of all points of intersection of the map of parallel extending lines in the surface 5).

The depth z associated with a pixel 27 is a function of the displacement L: $z = z_0(1 - L/L_0)$, in which $z_0$ is the depth of the line 28 and $L_0$ is the displacement of the horizon.

Figure 4:
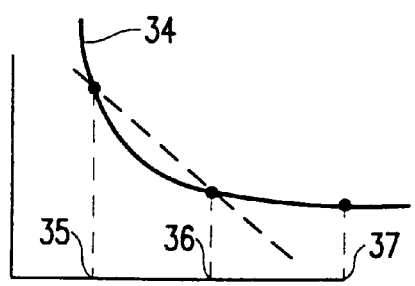
FIG. 4 shows the depth interpolation.

FIG. 4 shows an example of the function 34. In accordance with the invention the function 34 is approximated by interpolation. The function 34 is calculated, for example once for all pixels 27, for a number of predetermined displacement values L 35, 36, 37. Subsequently, for a requested pixel 27, having the coordinates $X^*_p, Y^*_p$ and the displacement L, it is determined which two of the predetermined displacement values 35, 36, 37 are nearest to the displacement determined. Subsequently, the ratio $\alpha$ of the distances of the displacement L determined to these two nearest predetermined displacement values is determined. The depth z associated with the displacement L determined is subsequently calculated as $Z^*$ $$Z^* = Z^*_1 + \alpha(Z^*_2 - Z^*_1)$$

Therein, $Z^*_1$ and $Z^*_2$ are the depths calculated for the nearest predetermined displacement values.

Evidently, other interpolation formules may also be used, for example a quadratic interpolation formule which is correct for three of the predetermined displacement values. The predetermined displacement values 35, 36, 37 need not be equidistant either; for example, in given circumstances the depth can be more accurately approximated by using appropriately preselected, non-equidistant points 35, 36, 37.

Preferably, the respective image contributions are determined successively for a series of pixels situated along a scan line in the image. A scan line is, for example a horizontal line in the image which corresponds to a line signal in a video signal in which pixels are consecutively arranged. The displacement values of successive pixels along such a scan line deviate each time by a fixed amount. Therefore, it is advantageous to calculate the displacement for an initial pixel on the scan line which is associated with the surface 5 and to calculate the displacement for subsequent pixels on the scan line each time by incrementing the displacement of the preceding pixel by said fixed amount.

The displacement L is preferably represented by an integer part I and a fractional part $\alpha$. The integer part I serves as an index for searching the pair of predetermined displacements nearest to the displacement L. The fractional part represents the ratio of the distances to the nearest predetermined displacements. Along the scan line the fractional part $\alpha$ is calculated each time by adding the fixed amount to the fractional part $\alpha$. When the fractional part $\alpha$ exceeds a maximum value as a result of addition, the fractional part $\alpha$ is reduced by said maximum value, and the integer part is incremented.

It has been found that for surfaces which are mapped on a region of pixels whose dimension remains below a minimum value, execution of the complete set of calculations required for interpolation is slower on existing computer hardware than the calculation of the depth z by calculating first the inverse 1/z (being linearly related to $X^*$ and $Y^*$) and subsequently inverting this inverse.

For given computer hardware the minimum value of the size can be determined experimentally, for example once (for use for all polygons). The time required for the calculations involving interpolation is approximated, for example as a constant part (independent of the size) and a size-dependent part, for example a part proportional to the size. The same holds for the time required for inversion. The point at which these approximations intersect as a function of the size constitutes the desired minimum value. The minimum value is chosen so that, generally speaking, beyond this value interpolation is faster, and that therebelow inversion is generally faster.

For example, the diameter of the region of pixels is used as a measure of the size or the maximum of the x-range and the y-range of this region, or the distance between the map of the vertices of a polygon, or the number of pixels in the region.

In an embodiment of the invention, preferably the size of the region on which the surface is mapped is estimated first. If this size is smaller than the minimum value, z is calculated by inversion and the interpolation is not executed.

Alternatively, for a region having a size below the minimum value the z of the vertices of the region can be calculated and the z of the pixels in the region can subsequently be determined by interpolation of the z of the vertices. The errors thus introduced are small because the region is small.

Figure 5:
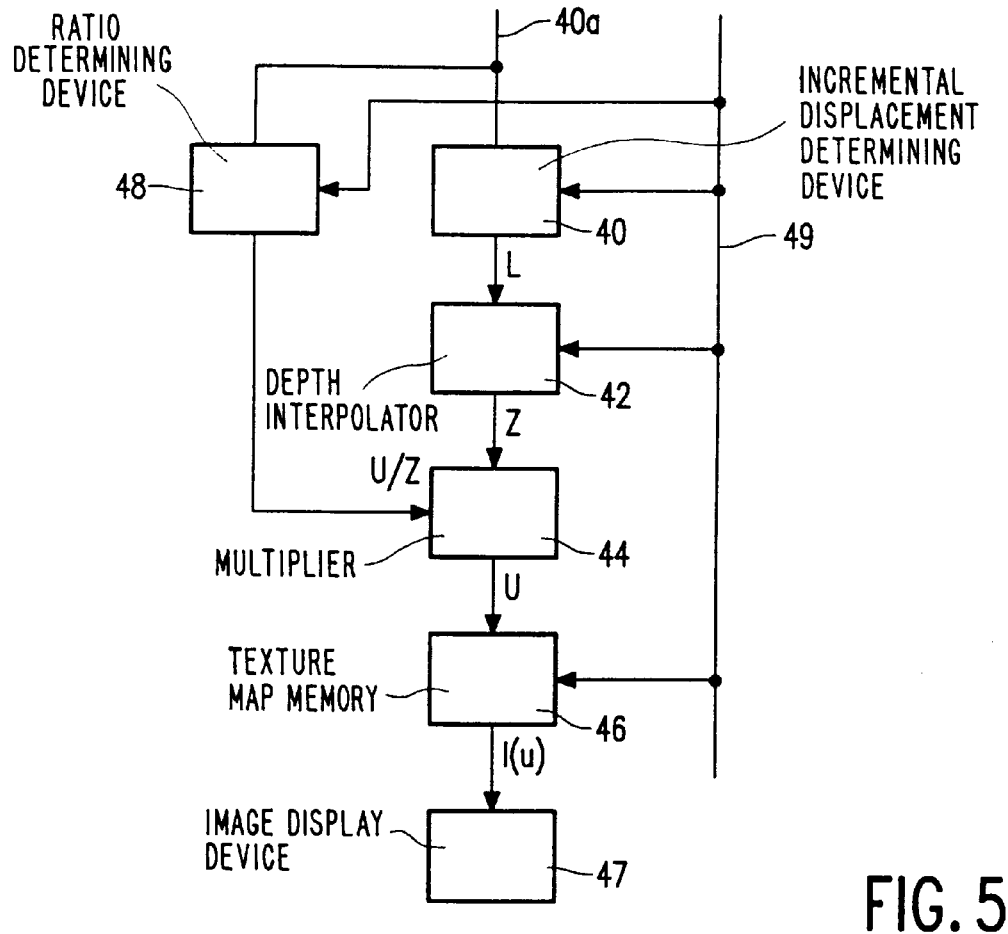
FIG. 5 shows a device for imaging with texture mapping.

FIG. 5 shows a device for mapping with texture mapping. The device includes a cascade connection of an incremental displacement determining device 40, a depth interpolator 42, a multiplier 44, a texture map memory 46, and an image display device 47. The input 40a of the incremental displacement-determining device 40 is also coupled to the input of a ratio-determining device 48; the output of the ratio determining device 48 is coupled to an input of the multiplier 44.

During operation the device forms the image contents for successive pixels on a scan line. A signal on the input 40a of the incremental displacement-determining device 40 indicates that a next pixel is concerned. In response thereto, the incremental displacement-determining device 40 increments the displacement value L determined for the preceding pixel by a fixed amount, indicating the increase of the displacement L from one pixel to another along the scan line. The depth interpolator 42 receives the displacement L thus calculated and calculates the depth z therefrom by interpolation. This depth is applied to the multiplier 44.

In response to the signal on the input of the incremental displacement-determining device 40, the ratio-determining device 48 increments the ratio $(U^*-u_0)/z$ of the offset of the texture coordinate $U^*$ and the depth z, determined for the preceding pixel, by a further fixed amount which indicates the increase of the ratio $(U^*-u_0)/z$ from one pixel to another along the scan line. The multiplier multiplies the ratio $(U^*-u_0)/z$ thus determined by the interpolated depth $Z^*$, thus generating the offset of the texture coordinate $U^*$. The latter is used as an address for reading the texture map memory 46. The resultant texture value $I(U^*)$ is subsequently used to calculate the image content for the pixel which is made visible to the viewer of the display device.

A plurality of surfaces can be processed in order to generate a complete image. For each surface the required fixed amounts whereby the displacement L and the ratio $(U^*-u_0)/z$ are incremented are each time loaded again via a bus 49. If necessary, the texture memory 46 is also loaded again or at least offsets referring to other texture in the texture memory are loaded.

FIG. 5 shows only the part of the circuit which is used for calculating a first one of the texture coordinates $U^*$. Evidently, when two-dimensional textures are used, a second texture coordinate $V^*$ is also calculated. This calculation is the same as that of the first texture coordinate. For this purpose use can be made of a further ratio determining device and a further multiplier which operate in parallel with the ratio determining device 48 and the multiplier 44 and receive the same interpolated depth $Z^*$. The further multiplier then generates the second texture coordinate $V^*$ which is applied to the texture map memory 46 as the second part of the texture address.

Figure 6:
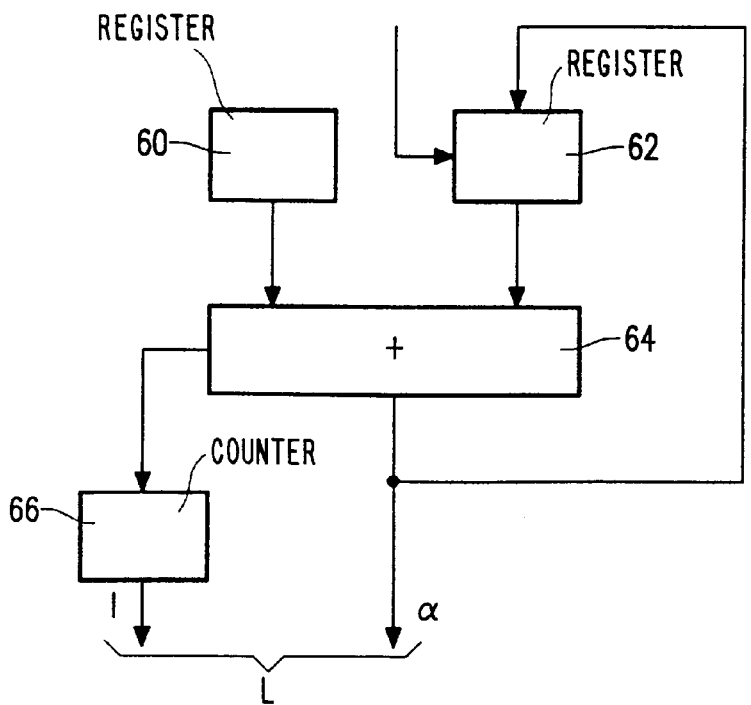
FIG. 6 shows a circuit for determining the displacement.

FIG. 6 shows a circuit for determining the displacement which is intended for use in the displacement-determining device 40. This circuit includes a first and a second register 60, 62 which are coupled to respective inputs of an adder 64. The adder 64 includes a sum output and an overflow output.

The overflow output is coupled to a counter 66. The sum output is coupled to an input of the second register 62.

During operation the first register 60 stores the fixed amount whereby the displacement is incremented for each successive pixel. The second register stores the fractional part α of the calculated displacement. For each successive pixel the adder 64 adds the fixed amount to the fractional part α. The sum is loaded into the second register 62 again. The adder 64 is, for example a binary adder which, in the case of overflow, outputs the sum modulo $2^n$ together with an overflow signal. This overflow signal then increments the count of the counter 66. The count of the counter 66 represents the integer part I of the displacement.

The integer part addresses a set of interpolation coefficients which are stored in a memory (not shown) in the interpolator 42, for example the coefficients $Z^*_1$ and $(Z^*_2-Z^*_1)$. The fractional part α controls the calculation whereby an interpolated depth $Z^*$ is determined from said interpolation coefficients as an approximation of the real depth z, for example as $Z^*=Z^*_1+\alpha(Z^*_2-Z^*_1)$.

The use of an interpolated depth $Z^*$ for calculating the contribution of texture to the image content of a pixel may give rise to image artefacts. The image artefacts can be maintained within acceptable limits by using a sufficiently small distance between the successive displacement values 35, 36, 37 wherebetween the depth is interpolated. These displacement values 35, 36, 37 define successive sub-ranges of the total displacement range. For each sub-range there is provided a respective set of interpolation coefficients. As the sub-range is smaller, i.e. as the displacement values 35, 36, 37 wherebetween interpolation takes place are closer to one another, the image artefacts are smaller. Preferably, the distance between the displacement values 35, 36, 37 wherebetween interpolation takes place is chosen in dependence on the parameters of the surface 5, so that for each surface to be reproduced a respective distance is chosen between successive displacement values wherebetween interpolation takes place.

The choice of the distance is made, for example as follows. The error Dz in the interpolated depth $Z^*$ causes an $U^*$, $V^*$ deviation in the calculated texture coordinates $U^*,V^*$. It has been found that a suitable criterion for the maximum acceptable error Dz follows from the following condition: the $U^*,V^*$ deviation caused by the error Dz must be a factor ε smaller than the change in $U^*,V^*$ between neighbouring pixels. Explicitly, for example, the error Dz must be so small that at least one of the following conditions is satisfied:

$Dz|dU^*/dz|<\epsilon|dU^*/dX^*|$ $Dz|dU^*/dz|<\epsilon|dU^*/dY^*|$ and that also at least one of the following conditions is satisfied:

$Dz|dV^*/dz|<\epsilon|dV^*/dX^*|$ $Dz|dV^*/dz|<\epsilon|dV^*/dY^*|$ (The unit in which $X^*$ and $Y^*$ are expressed is chosen so that $X^*$ increases by 1 from one pixel to another; the same holds for $Y^*$).

The error Dz in its turn can be expressed in the distance between successive displacement values wherebetween interpolation takes place. The maximum permissible distance is the distance yielding a maximum Dz which still satisfies at least one of the above conditions for $U^*$ and at least one of the above conditions for $V^*$.

The choice of the factor ε requires a compromise: a small factor ε ($U^*,V^*$ deviation very small) means that the distance becomes very small and hence much arithmetic work is required to calculate the depths associated with displacement values wherebetween interpolation takes place; an excessively large factor ε leads to visible image artefacts. The factor ε is preferably smaller than 1. It has been found that a factor ε=½ offers suitable results.

It has been found in practice that the choice of the maximum permissible distance between successive displacement values wherebetween interpolation takes place can be reliably made by evaluating the above conditions for a limited number of points only (for example, three vertices of a polygonal surface). To this end, per vertex the derivatives $dU^*/dX^*$ etc. and $dU^*/dz$ etc. are calculated. The largest of the ratios $|dU^*/dX^*|/|dU^*/dz|$ is then chosen; this ratio will be referred to as MAXU. Furthermore, the largest of the ratios $|dV^*/dX^*|/|dV^*/dz|$ is also chosen and referred to as MAXV. The smaller one of MAXU and MAXY will be denoted as MAX. The above conditions are satisfied if Dz<εMAX for all vertices.

It has also been found that the maximum interpolation error Dz occurring can be reliably determined by determining the depth z halfway an interpolation interval around such a vertex both exactly (by inversion of 1/z) and by interpolation between two 1/z values which are situated one half distance above and below the 1/z values of the vertex. The difference between the depths thus obtained is a reliable measure of the maximum error Dz (the actual error is at most 32/27 of the difference). This difference equals $Dz=d^2z/(z^2-d^2)$ (therein, z is the depth of such a vertex and d is half the distance times the derivative along that distance). The maximum permissible distance is found, for example by deriving the distance by solution of the equation Dz=εMAX for the maximum error Dz thus found.

Evidently, this is merely a practice-proven example of how to choose the distance between successive displacement values wherebetween interpolation takes place. Prior to the calculation of the image contribution by the surface this distance is calculated and subsequently the image contributions are calculated as described above, interpolation then taking place between displacements which are situated the calculated distance apart.

It has been found in practice that the interpolated depth $Z^*$ can be advantageously used not only for texture interpolation but also for other purposes, for example Z-buffer updates. In order to ensure that no excessive errors are introduced in that case, it is attractive to impose not only the above conditions as regards Dz ($Dz|dU^*/dz|<\epsilon|dU/dX|$ etc.), but also comparable conditions in respect of the error in the interpolated depth Z:

$Dz<\epsilon|dZ^*/dX^*|$ $Dz<\epsilon|dZ^*/dY^*|$

Dz is then made so small that at least one of these two conditions is also satisfied.

Generally speaking, for the specific interpolation formule used the distance between successive displacements wherebetween the depth is interpolated is chosen in dependence on the parameters of the surface to be reproduced. For the generating of an image, a number of surfaces will be reproduced in the image; in accordance with the invention the distance between successive displacement values wherebetween interpolation takes place is separately chosen, in dependence on the properties of the relevant surface, for each of said surfaces.

Thus, the distance between successive displacement values wherebetween interpolation takes place is adapted to the properties of the surface in such a manner that an imaging error occurs which can still be accepted, thus saving the arithmetic work otherwise spent on unnecessarily accurate images.

Texture mapping usually utilizes a MIPMAP: a set of texture maps of increasing resolution. For the calculation of an image contribution to a pixel having coordinates $X^*,Y^*$, a texture value $T(U^*,V^*)$ is read from one texture map, chosen from this set, or interpolated between the texture values $T(U^*,V)$ and $T'(U^*,V^*)$ of two texture maps. Said one or two texture maps are chosen on the basis of a value "LOD" which is a measure of the part of the texture space (range of $U^*,V^*$ coordinates) mapped, after rounding, on the same pixel having coordinates $X^*,Y^*$, for example by determining the maximum value of the derivatives $dU^*/dX^*$, $dU^*/dY^*$ etc. This is performed to avoid aliasing. For the interpolation between two texture maps the relative weight allocated to the two texture maps is also taken in dependence on the value LOD.

In accordance with the invention, the value LOD is preferably also determined by interpolation as a function of the displacement, using the same distance between successive displacement values wherebetween interpolation takes place as used for the interpolation of the depth z. Thus, the depth as well as the value LOD can be calculated from one calculation of the displacement.

We claim:

1. A method for graphics mapping of a surface from an at least three-dimensional model space onto a two-dimensional image, in which a texture coordinate is allocated to a point on the surface and the point is projected onto a pixel of the image along a projection axis, which method includes the following steps determining a normalized coordinate which is a ratio of the texture coordinate to a depth of the point along the projection axis;

determining an image contribution by the point to an image content of the pixel on the basis of the texture coordinate; characterized in that the determination of the depth includes the following steps:

determining a displacement of the pixel relative to a line in the image onto which there is projected a part of the surface which has a constant depth in the projection direction;

calculating an interpolation function which interpolates the depth as a function of the displacement, wherein a size of a representation of the surface on the image is determined, and that, if the size is below a predetermined minimum, first an inverse of the depth is determined, after which the depth is determined by inversion of the inverse.

2. A method as claimed in claim 1, in which the pixel is preceded by a series of pixels on a scan line in the image, characterized in that the displacement is determined by adding an increment to a further displacement of a preceding pixel of the series.

3. A method as claimed in claim 2, characterized in that there is a range of displacements of pixels onto which the surface is mapped, which range is subdivided into sub-ranges of displacements, in that for calculation of the interpolation function in each sub-range of displacement a respective set of interpolation coefficients is used, and in that the method includes a step of selecting a resolution of the subdivision into sub-ranges in dependence on a property of the surface.

4. A method as claimed in claim 1, characterized in that there is a range of displacements of pixels onto which the surface is mapped, which range is subdivided into sub-ranges of displacements, in that for calculation of the interpolation function in each sub-range of displacement a respective set of interpolation coefficients is used, and in that the method includes a step of selecting a resolution of the subdivision into sub-ranges in dependence on a property of the surface.

5. A method as claimed in claim 1, which utilizes an indexed set of texture maps having an index-dependent resolution, a current index being selected from the set of texture maps and the image contribution being determined in conformity with a texture value associated with the texture coordinate in an indexed texture map, characterized in that the current index is calculated by means of a further interpolation function of indices as a function of the displacement.

6. A method as claimed in claim 1, characterized in that there is a range of displacements of pixels onto which the surface is mapped, which range is subdivided into sub-ranges of displacements, in that for calculation of the interpolation function in each sub-range of displacement a respective set of interpolation coefficients is used, and in that the method includes a step of selecting a resolution of the subdivision into sub-ranges in dependence on a property of the surface.

7. A method as claimed in claim 1, characterized in that there is a range of displacements of pixels onto which the surface is mapped, which range is subdivided into sub-ranges of displacements, in that for calculation of the interpolation function in each sub-range of displacement a respective set of interpolation coefficients is used, and in that the method includes a step of selecting a resolution of the subdivision into sub-ranges in dependence on a property of the surface.

8. A method as claimed in claim 7, which utilizes an indexed set of texture maps having an index-dependent resolution, a current index being selected from the set of texture maps and the image contribution being determined in conformity with a texture value associated with the texture coordinate in an indexed texture map, characterized in that the current index is calculated by means of a further interpolation function of indices as a function of the displacement.

9. A device for graphics mapping of a surface from an at least three-dimensional model space onto a two-dimensional image, in which a texture coordinate is allocated to a point on the surface and the point is projected onto a pixel of the image along a projection axis, which device includes coordinate-determining means for determining a normalized coordinate which is a ratio of the texture coordinate to a depth of the point along the projection axis;

depth-determining means for determining the depth of the point;

multiplier means for multiplying the normalized coordinate by the depth in order to obtain the texture coordinate;

image-forming means for determining an image contribution by the point to an image content of the pixel on the basis of the texture coordinate; characterized in that the depth-determining means include displacement-determining means for determining a displacement of the pixel relative to a line in the image onto which there is projected a part of the surface which has a constant depth in the projection direction;

interpolation means for calculating an interpolation function which interpolates the depth as a function of the displacement; and means for determining a size of a representation of the surface on the image, and the device is arranged to determine, if the size is below a predetermined minimum, first an inverse of the depth and subsequently the depth by inversion of the inverse.

10. A device as claimed in claim 9, arranged to determine respective image contributions for each of a series of pixels on a scan line in the image, characterized in that the displacement-determining means include incrementation means which determine the displacement of the pixel by adding an increment to a further displacement of a preceding pixel of the series.

11. A device as claimed in claim 10, characterized in that it includes means for determining a size of a representation of the surface on the image, and that it is arranged to determine, if the size is below a predetermined minimum, first an inverse of the depth and subsequently the depth by inversion of the inverse.

12. A device as claimed in claim 10, characterized in that there is a range of displacements of pixels onto which the surface is mapped, which range is subdivided into subranges of displacements, that the device includes a memory for storing an associated set of interpolation coefficients for each sub-range, the interpolation means being arranged to calculate the interpolation function for each sub-range in conformity with the associated set of interpolation coefficients from the memory, and that the device includes coefficient-determining means for determining the respective sets of interpolation coefficients, said coefficient-determining means selecting a resolution of the subdivision into sub-ranges in dependence on a property of the surface.

13. A device as claimed in claim 10, including a further memory for storing an indexed set of texture maps having an index-dependent resolution;

index-selection means for selecting a current index, the image-forming means determining the image contribution in conformity with a texture value associated with the texture coordinate in an indexed texture map, characterized in that the device includes index-interpolation means for calculating the current index by means of a further interpolation function of indices as a function of the displacement.

14. A device as claimed in claim 9, characterized in that there is a range of displacements of pixels onto which the surface is mapped, which range is subdivided into sub-ranges of displacements, that the device includes a memory for storing an associated set of interpolation coefficients for each sub-range, the interpolation means being arranged to calculate the interpolation function for each sub-range in conformity with the associated set of interpolation coefficients from the memory, and that the device includes coefficient-determining means for determining the respective sets of interpolation coefficients, said coefficient-determining means selecting a resolution of the subdivision into sub-ranges in dependence on a property of the surface.

15. A device as claimed in claim 9, including a further memory for storing an indexed set of texture maps having an index-dependent resolution;

index-selection means for selecting a current index, the image-forming means determining the image contribution in conformity with a texture value associated with the texture coordinate in an indexed texture map, characterized in that the device includes index-interpolation means for calculating the current index by means of a further interpolation function of indices as a function of the displacement.

16. A device as claimed in claim 9, characterized in that there is a range of displacements of pixels onto which the surface is mapped, which range is subdivided into sub-ranges of displacements, that the device includes a memory for storing an associated set of interpolation coefficients for each sub-range, the interpolation means being arranged to calculate the interpolation function for each sub-range in conformity with the associated set of interpolation coefficients from the memory, and that the device includes coefficient-determining means for determining the respective sets of interpolation coefficients, said coefficient-determining means selecting a resolution of the subdivision into sub-ranges in dependence on a property of the surface.

17. A device as claimed in claim 16, including a further memory for storing an indexed set of texture maps having an index-dependent resolution;

index-selection means for selecting a current index, the image-forming means determining the image contribution in conformity with a texture value associated with the texture coordinate in an indexed texture map, characterized in that the device includes index-interpolation means for calculating the current index by means of a further interpolation function of indices as a function of the displacement.

\* \* \* \* \*